United States Patent [19]

Haughton et al.

[11] 3,960,275

[45] June 1, 1976

[54] MODULAR DISPLAY SYSTEM WITH INTERLOCKING FRAME MEMBERS

[75] Inventors: Paul F. Haughton, Troutman; Thomas E. McCoy, Mooresville, both of N.C.

[73] Assignee: Romac Metals, Inc., Troutman, N.C.

[22] Filed: Nov. 12, 1975

[21] Appl. No.: 631,107

[52] U.S. Cl. ............................ 211/182; 108/111; 108/153; 403/194; 403/260; 182/228
[51] Int. Cl.² ........................ A47F 5/14; A47B 3/00; F16B 9/00
[58] Field of Search .......... 211/177, 182, 176, 134, 211/148, 60; 108/101, 107, 111, 153, 156; 312/257 R, 257 SK; 403/194, 258, 247, 261, 347, 354, 356, 361, 375, 376, 381, 383, 260, 263, 252, 386, 178, 231, 254, 257, 295, 187, 192; 256/22, 65; 5/200 C, 201; 52/758 R, 758 H, 758 F, 753 R; 182/228

[56] References Cited
UNITED STATES PATENTS

| | | | |
|---|---|---|---|
| 2,577,838 | 12/1951 | Baldwin, Jr. | 403/258 X |
| 2,594,561 | 4/1952 | Huck | 403/258 X |
| 2,726,524 | 12/1955 | Gorin | 403/376 X |
| 2,730,419 | 1/1956 | Watrous et al. | 108/156 |
| 3,002,582 | 10/1961 | Marcelis | 182/228 X |
| 3,062,571 | 11/1962 | Goldman | 403/383 X |
| 3,071,399 | 1/1963 | Cronin | 211/182 X |
| 3,181,902 | 5/1965 | Aitken | 403/258 |
| 3,427,056 | 2/1969 | Cunningham | 403/258 |
| 3,519,292 | 7/1970 | Krikorian | 403/260 X |

FOREIGN PATENTS OR APPLICATIONS

| | | | |
|---|---|---|---|
| 420,531 | 3/1967 | Switzerland | 211/191 |

*Primary Examiner*—Roy D. Frazier
*Assistant Examiner*—Terrell P. Lewis
*Attorney, Agent, or Firm*—Bell, Seltzer, Park & Gibson

[57] ABSTRACT

This display system includes tubular frame components which are easy to assemble, disassemble and rearrange to form various types of display units. The frame components are provided with interlocking connector means which includes a multi-sided stud extending outwardly from one end of one frame component and the other frame component has first and second multi-sided openings provided in opposite walls thereof and aligned perpendicular to the longitudinal axis of the frame component to receive the multi-sided stud therein. Means is provided for removably locking the multi-sided stud of one frame component in the first and second multi-sided openings in the other frame component to rigidly maintain the adjacent end of the one frame component against one wall of the other frame component and in right-angular and non-rotating relationship thereto.

7 Claims, 6 Drawing Figures

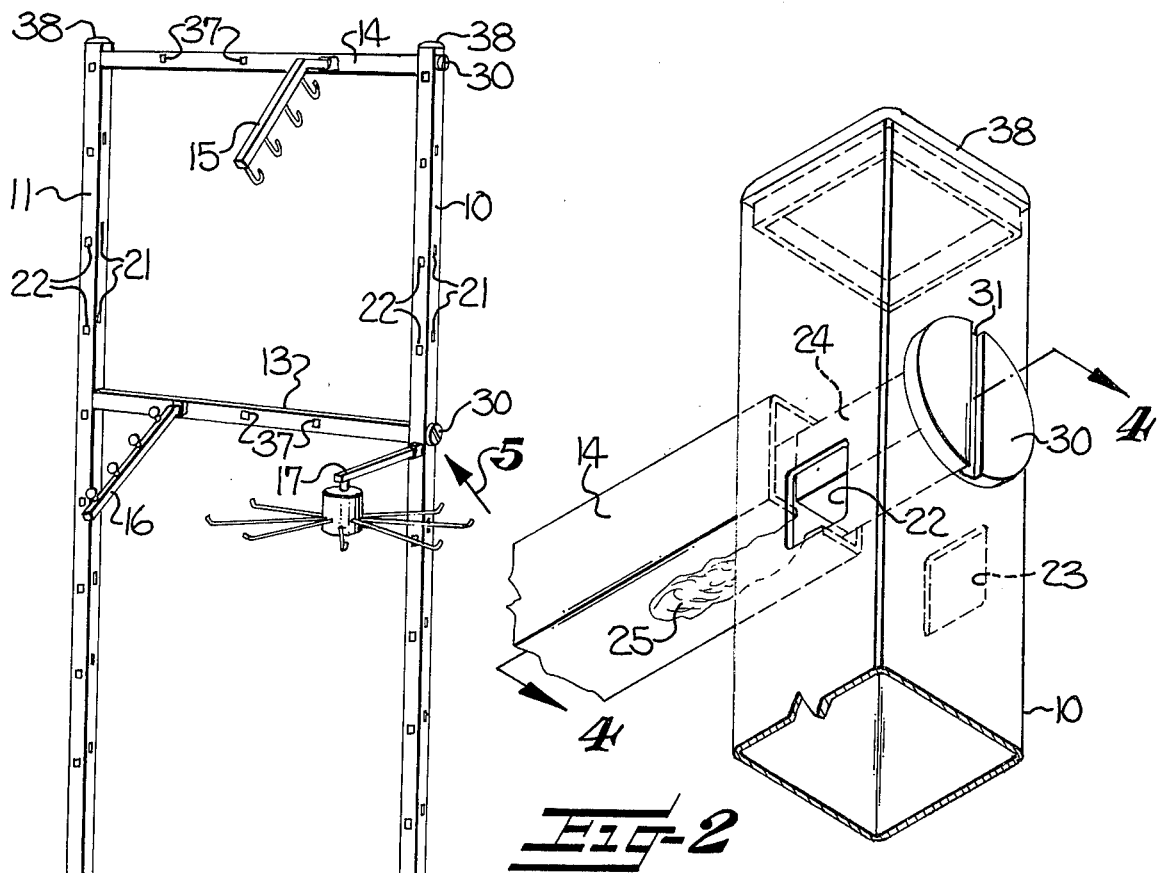
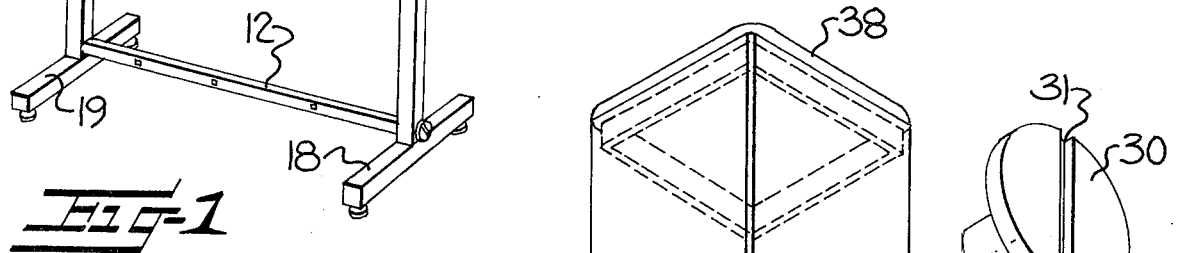
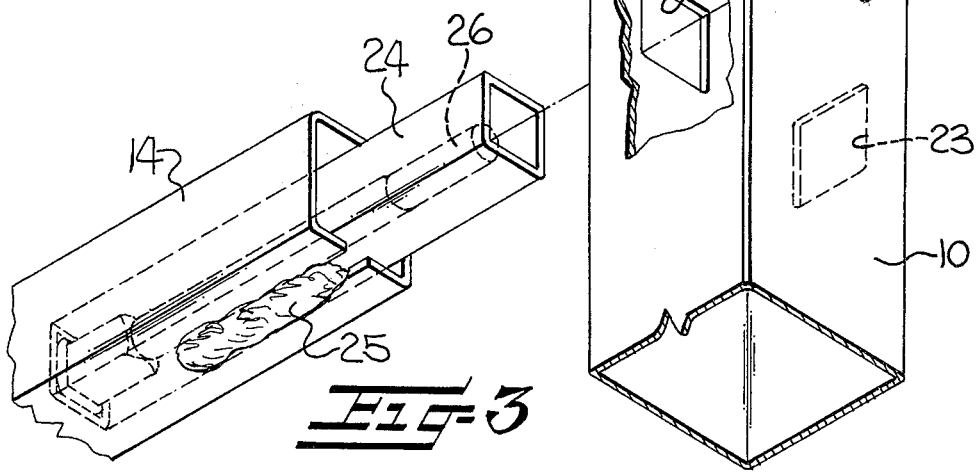

MODULAR DISPLAY SYSTEM WITH INTERLOCKING FRAME MEMBERS

This invention relates generally to a modular display system formed of interlocking tubular frame components or members and more particularly to such a system including simple and economical means for rigidly interlocking one frame member to another frame member for easy assembly and disassembly.

Various types of open frame structures have heretofore been provided for use as merchandise display units, article support stands and the like and many of these open frame structures have included some means for removably connecting together the frame members. However, the known types of connector means project outwardly from the frame structures and may damage displayed objects or persons; they are expensive to manufacture and difficult to connect and disconnect; and/or they easily become loosened during use so that they do not provide the type of rigid connection required in such frame structures.

Accordingly, it is an object of the present invention to provide a modular display system with interlocking frame members having improved connector means for rigidly interlocking the frame members in right-angular relationship to each other and which connector means is simple, economical, and maintains a rigid connection between the frame members over a long period of use.

In accordance with the present invention, the connector means includes a multi-sided stud extending outwardly from one end of a first frame member and first and second multi-sided openings in opposite walls of a second frame member. The multi-sided first and second openings are aligned perpendicular to the longitudinal axis of the second frame member and are adapted to receive the multi-sided stud extending outwardly from the end of the first frame member. Means is provided for removably locking the multi-sided stud in position in the first and second multi-sided openings in the second frame member to maintain the adjacent end of the first frame member against one wall of the second frame member and in a rigid, non-rotating and right-angular relationship thereto. The frame members are preferably tubular and square and the multi-sided stud as well as the first and second multi-sided openings are also preferably square. The locking means is preferably in the form of an internally threaded nut having an enlarged head which is slotted to receive a coin for rotating the locking nut during assembly and disassembly of the frame structure. The locking nut maintains the square stud in the square openings when it is threaded onto the free end of a bolt positioned in the square stud to provide a rigid connection between the frame members.

Other objects and advantages will appear as the description proceeds when taken in connection with the accompanying drawings, in which FIG. 1 is a perspective view of one form of modular display system which may be formed with the interlocking frame members of the present invention;

FIG. 2 is an enlarged fragmentary isometric view looking at the upper right-hand corner of the display system shown in FIG. 1;

FIG. 3 is a view similar to FIG. 2, but showing the parts in exploded position;

The modular display system of the present invention generally includes second frame members which are illustrated as vertical support posts 10, 11 and first frame members which are illustrated as horizontal connector frame members 12, 13 and 14, extending between and connecting the support posts 10, 11. Of course, any number of support posts 10, 11 may be provided and connected together in any desired manner by any number of connector frame members 12, 13 and 14 to form various types of modular display systems. If desired, any number of different types of display attachments, indicated at 15, 16 and 17 may be attached to either the support posts 10, 11 or to the connector frame members 13, 14 as indicated in FIG. 1, to support and display various types of merchandise. The lower ends of the support posts 10, 11 may be provided with horizontal foot portions 18, 19.

Figure 4:
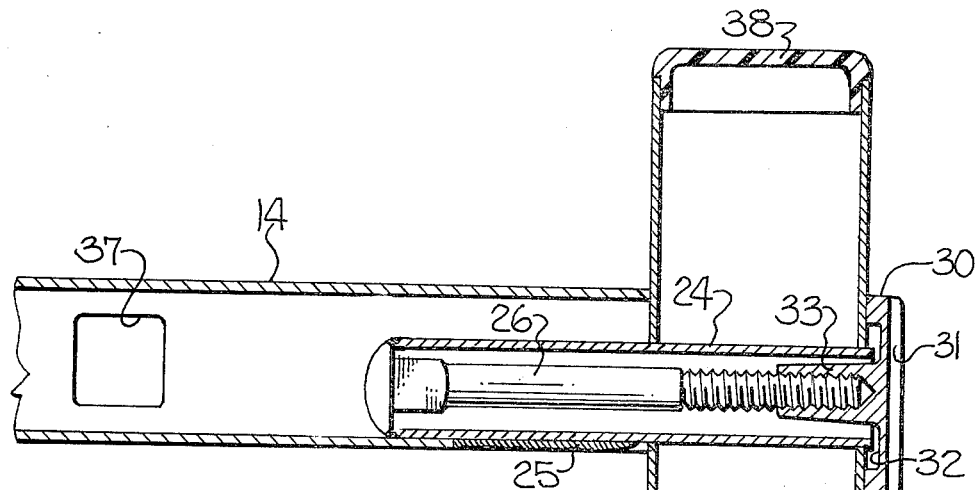
FIG. 4 is a vertical sectional view taken substantially along the line 4—4 in FIG. 2 and illustrating the means for removably locking the frame members together.

As best illustrated in FIGS. 2–4, the present modular display system includes at least a pair of tubular frame members with one of the frame members, connector frame member 14, extending outwardly at a right angle from the other frame member, support post 10. Connector means is provided for rigidly interconnecting the one frame member 14 to the other frame member 10 so that the frame members are maintained in rigidly aligned and non-rotating position. The interlocked frame members are easy to assemble and disassemble and the components of the display system may be rearranged to form various types of displays. The assembly and disassembly of the display system requires no special tools or skills and the connector means may be easily manipulated by the use of a coin.

As illustrated, the frame members are tubular and square in cross-section with the support posts 10, 11 being larger than the connector frame members 12, 13 and 14. However, it is to be understood that the tubular frame members may be round or they may have other cross-sectional shapes. Also, the frame members may be of the same size, if desired.

The connector means includes spaced apart first multi-sided openings 20 in one wall of the support post 10 and spaced apart second multi-sided openings 21 in the opposite wall of the support post 10. Similar multi-sided first and second openings 22, 23 are offset relative to the openings 20, 21 and spaced along the other opposed walls of the support post 10. The first and second openings 20, 21 are of the same size and shape and are aligned perpendicular to the longitudinal axis of the support post 10.

The connector means also includes a multi-sided stud 24 extending outwardly from the end of the frame member 14 and the stud 24 has a size and shape sufficient to provide a close fit in the first and second openings 20, 21 in the support post 10. As best illustrated in FIG. 3, the size and shape of the outer surface of the stud 24 is smaller than the size and shape of the adjacent end of the frame member 14 so that the outer end of the frame member 14 forms a shoulder which is drawn against the side of the support post 10 when the two members are interlocked, in a manner to be presently described.

As best shown in FIG. 4, the length of the portion of the stud 24 extending outwardly beyond the end of the frame member 14 is at least equal to the distance between the outer surfaces of the opposite walls of the support post 10 and is preferably a slight bit longer, for purposes to be presently described. The stud 24 and the openings are illustrated as being square, however, it is to be understood that they could have other multi-sided non-round shapes, such as triangular, rectangular or other polygonal shapes such as a pentagon, hexagon, etc.

The stud 24 is preferably tubular and the inner end portion thereof is fixed to the inner surface of one wall of the frame member 14 in any suitable manner, illustrated as welding 25 (FIG. 3) in a slot cut in the lower wall of the frame member 14. The head end portion of a carriage bolt 26 is suitably secured in the inner end portion of the tubular stud 24, as by welding, and has a threaded free end portion terminating adjacent the free end portion of the tubular stud 24 and preferably recessed therein (FIG. 3).

The connector means also includes a nut to hold the frame members in assembled position and the nut has an enlarged head portion 30 having a diameter larger than the square opening 21. The outer surface of the enlarged head 30 is slotted, as indicated at 31, for insertion of a screw driver, a coin, or the like to rotate the nut. The inner surface of the enlarged head 30 of the nut is provided with an annular groove or recess 32 (FIG. 4) so that an annular bearing surface is provided on the outer periphery of the enlarged head 30. The annular recess 32 also permits the free end portion of the tubular stud 24 to extend outwardly beyond the outer surface of the side wall of the support post 10, if desired.

The locking nut is also provided with a reduced hub portion 33 which is of a sufficiently small diameter to extend inside of the tubular stud 24 and which is internally threaded so that it may be threaded onto the threaded free end of the bolt 26 when the stud 24 is inserted into the first and second openings 20, 21 as illustrated in FIG. 4. When the nut is threaded onto the bolt 26, as shown in FIG. 4, the frame member 14 is rigidly connected and interlocked to the support post 10 and the frame member 14 will not rotate relative thereto and will not easily become disconnected therefrom until the locking nut is removed from the bolt 26.

Figure 5:
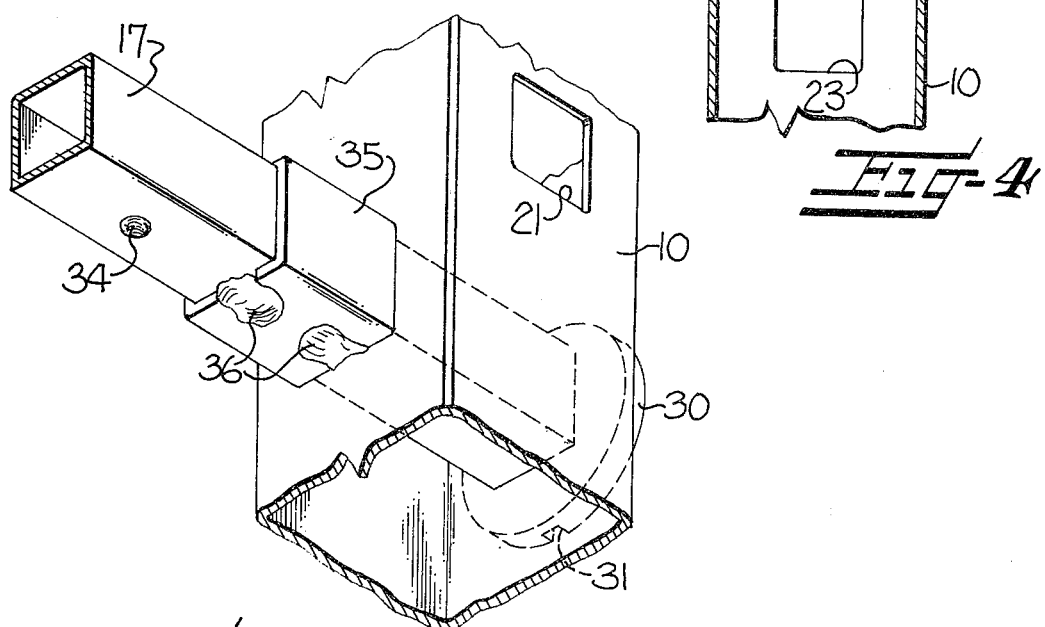
FIG. 5 is a fragmentary isometric view looking in the direction of the arrow 5 in FIG. 1 and illustrating a display attachment connected to the frame member which forms a support post.
Figure 6:
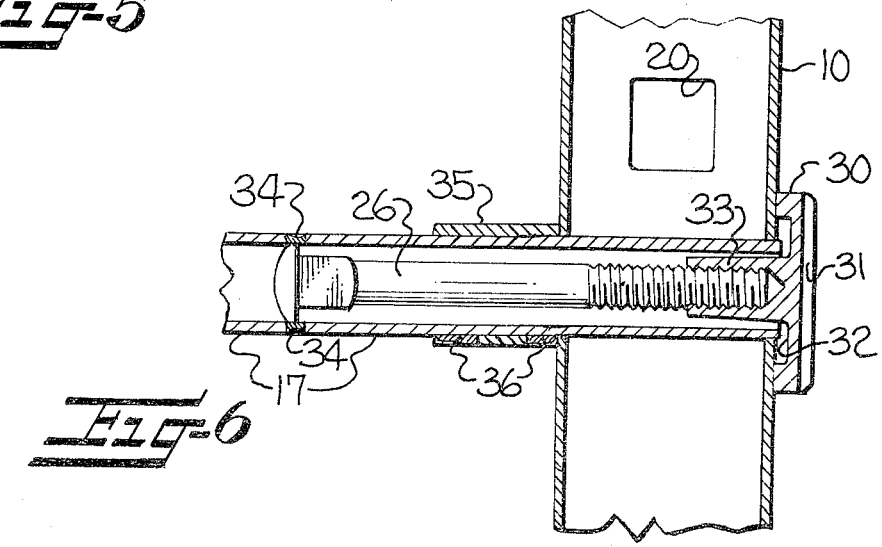
FIG. 6 is a vertical sectional view through FIG. 5.

The display attachments 15, 16 and 17 are also preferably interlocked with the frame members in substantially the same manner as the frame members are interlocked together. As illustrated in FIGS. 5 and 6, the inner or locking end of the display attachment 17 is square and is of the proper size to provide a close fit in the square openings in opposite walls of the support post 10. The head of the bolt 26 is fixed on the inner surface of the display attachment 17 by means of welding 34 in holes bored through the tubular member 17. The internally threaded hub 33 of the locking nut is threaded on the free end of the bolt 26 so that the enlarged head portion 30 bears against the outer wall of the support post 10 to lock the attachment display arm 17 to the post 10. A sleeve or collar 35 is fixed, as by welding 36, to the outer surface of the display attachment arm 17 and forms a shoulder bearing against the wall of the support post 10 when the locking nut is threaded on the bolt 26 to provide a rigid connection between the display attachment arm 17 and the support post 10. The display attachments 15, 16 are supported in square openings 37 (FIG. 1) spaced along the connector frame members 13, 14.

As has been explained, the size and shape of the support post 10, 11 and connector frame members 12, 13, 14 may be varied. It has been found that an attractive modular display system is provided when the supporting posts and connector frame members are formed of polished stainless steel and the posts 10, 11 are 1½ inches square while the connector frame members 12, 13 and 14 are one inch square. The openings in the frame members are five-eighths of an inch square and are spaced every six inches along both the support posts 10, 11 and the connecting frame members 12, 13 and 14. The upper ends of the support posts 10, 11 may be provided with suitable caps or covers, such as the plastic caps 38 shown in cross-section in FIG. 4.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. In a modular display system with interlocking frame members including at least a pair of tubular frame members with one of said frame members extending outwardly at a right angle from the other of said frame members, the combination therewith of connector means for rigidly interlocking said one frame member to said other frame member, said connector means comprising
   a. said other frame member having a first multi-sided opening in one wall and a secnd multi-sided opening in the opposite wall thereof, said first and second openings being of the same size and shape and being aligned perpendicular to the longitudinal axis of said other frame member,
   b. said one frame member including a multi-sided stud extending outwardly from the end of said one frame member and having a size and shape sufficient to provide a close fit of said stud in said first and second multi-sided openings in said other frame member, said predetermined size and shape of said stud being smaller than the size and shape of the adjacent end of said one frame member, and the length of said multi-sided stud being at least equal to the distance between the outer surfaces of said opposite walls of said other frame member, and
   c. means for removably locking said multi-sided stud of said one frame member in position in said first and second multi-sided openings in said other frame member to maintain the adjacent end of said one frame member against said one wall of said other frame member and in right angular and non-rotating relationship thereto.

2. In a modular display system according to claim 1 wherein said first and second openings in said other frame member are rectangular and are of a predetermined width and height, and wherein said stud is also rectangular and has a width and height sufficient to provide a close fit of said stud in said first and second rectangular openings.

3. In a modular display system according to claim 2 wherein said first and second rectangular openings in said other frame member are square, and wherein said stud is also square.

4. In a modular display system according to claim 1 wherein said stud has an inner end portion extending inside of said one frame member, and including means for securing said inner end portion of said stud to the inner surface of one wall of said one frame member.

5. In a modular display system according to claim 4 wherein said stud is tubular, and wherein said means for removably locking said stud to said other frame member comprises a bolt fixed in said tubular stud, said bolt including a threaded free end positioned in said tubular stud, and a locking nut including an enlarged head portion having a diameter larger than said square openings and an internally threaded hub portion, said hub portion being of a sufficiently small diameter to extend inside of said tubular stud for threading onto said threaded free end of said bolt.

6. In a modular display system according to claim 3 including display attachments adapted to be removably supported on said tubular frame members, each of said display attachments being tubular and square in cross-section, the size of the free end of said display attachment being sufficient to provide a close fit of said free end in said first and second openings in said frame members, and a collar fixed on the outer surface of said display attachment and spaced from said free end a distance equal to the distance between the outer surfaces of the opposite walls of said frame member, and including means for removably locking said display attachment in position in said first and second openings in said frame member.

7. In a modular display system according to claim 6 wherein said free end of said display attachment is tubular, and wherein said means for removably locking said display attachment in position in said frame member comprises a bolt fixed in said tubular free end of said display attachment, said bolt including a threaded free end positioned in said tubular display attachment, and a locking nut including an enlarged head portion having a diameter larger than said square openings and an internally threaded hub portion, said hub portion being of a sufficiently small diameter to extend inside of said tubular free end of said display attachment for threading onto said threaded free end of said bolt.

* * * * *